Aug. 21, 1945.  M. ARTZT  2,383,360
SYNCHRONIZING DEVICE
Filed Sept. 30, 1943  2 Sheets-Sheet 2

LOW CURRENT

HIGH CURRENT

INVENTOR.
MAURICE ARTZT
BY
ATTORNEY

Patented Aug. 21, 1945

2,383,360

UNITED STATES PATENT OFFICE 2,383,360

SYNCHRONIZING DEVICE

Maurice Artzt, Princeton, N. J., assignor to Radio Corporation of America, a corporation of Delaware Application September 30, 1943, Serial No. 504,337

6 Claims. (Cl. 178—69.5)

The present invention relates in general to systems for synchronizing the operation of two devices, and more particularly to synchronizing arrangements for facsimile systems.

In the transmission and reception of facsimile signals, a high degree of accuracy must be maintained between the scanning apparatus at the transmitting station and the scanning apparatus at a receiving station or stations which records the transmitted facsimile signals. The present invention provides a novel arrangement by which the speed of a motor having a variable speed characteristic may be controlled. The speed control arrangement of the present invention permits the use of a variable speed motor for driving the scanning apparatus of a facsimile transmitter or recorder in synchronism with another scanner.

Accordingly, the principal object of the present invention is to provide a novel arrangement for controlling the speed of a variable speed motor with a high degree of precision.

Another object of the invention is to provide a novel arrangement for obtaining a control voltage which is proportional to the instantaneous errors in the speed of the motor over a wide angular range of departure from the synchronous position.

More specifically, the invention has for its aim to provide a method of and means for obtaining a control voltage which is linear with phase angle by comparing voltages which differ in phase from zero to 180°.

This aim is fulfilled by comparing electrical waves of square wave form so as to produce a series of pulses, the effective value of which varies linearly with respect to the time displacement of one of the waves of square wave form.

The present invention, in general, comprises facsimile transmitting or recording apparatus driven by a variable speed motor to which is mechanically coupled means for developing electrical waves in accordance with scanning speed. The phase of the signals developed in this manner is compared with the phase of a received tone or other reference tone, and the resultant comparison wave is utilized to produce a changeable retarding effect on the scanner. This retarding effect may be increased or decreased when the scanner departs from synchronism as will be pointed out hereinafter. If the motor and scanner are directly coupled mechanically, the angular position of the motor rotor will be changed with respect to its synchronous angular position.

Figure 1:
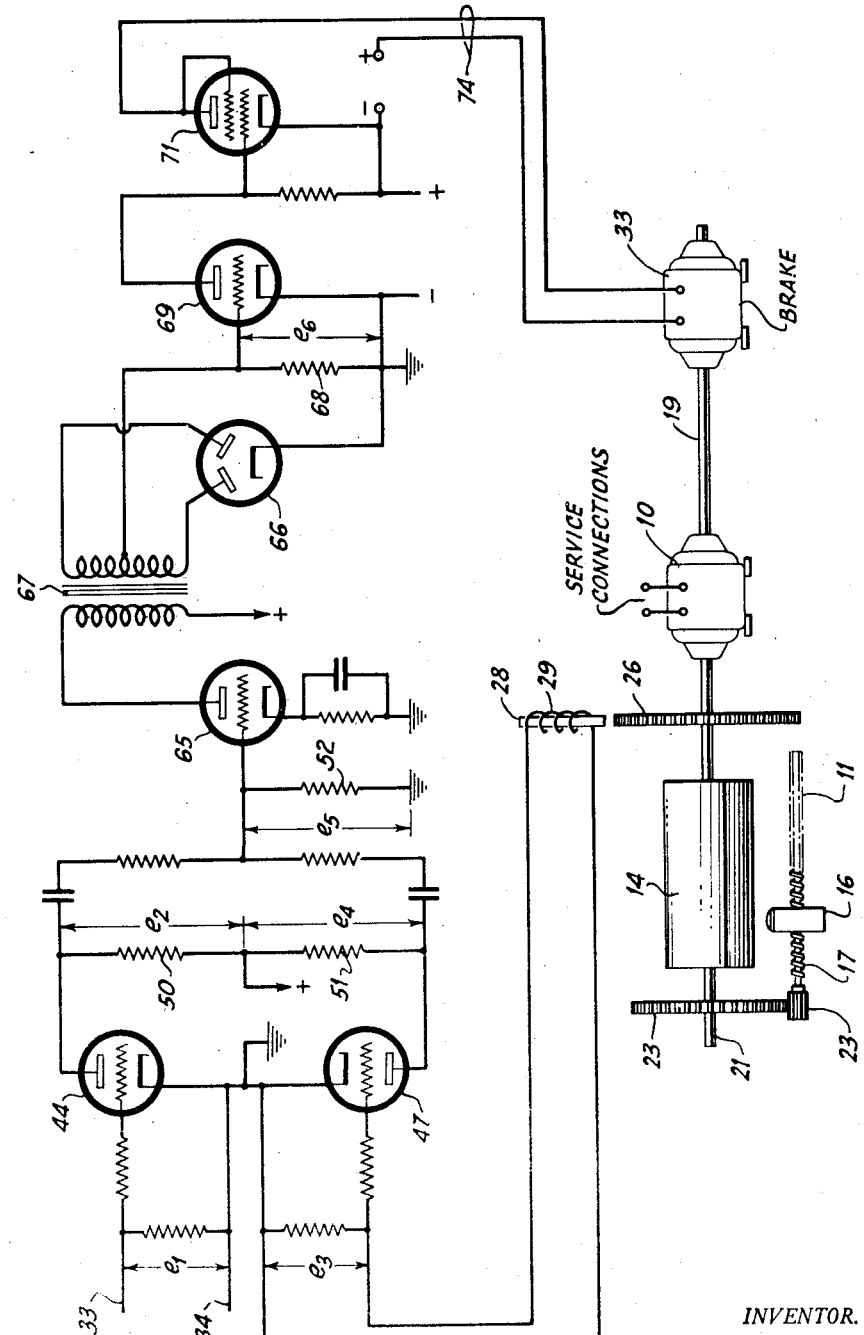
Figure 2:
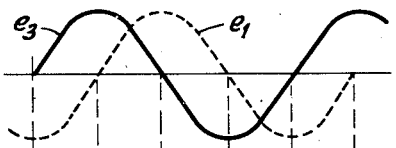
Figure 6:
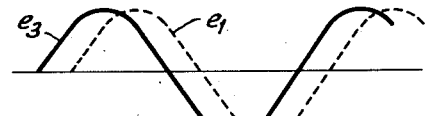

The invention will be understood by reference to the accompanying drawings in which:

Fig. 1 is a diagrammatic showing of a facsimile station embodying the present invention in one form;

Figs. 2 to 9 inclusive are explanatory diagrammatic curves; and

Figure 10:
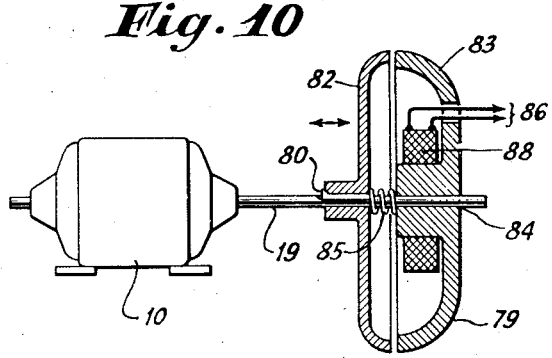

Fig. 10 shows a modification of the apparatus of Fig. 1.

Referring to Fig. 1 of the drawings, a variable speed motor such as an induction motor 10 is shown as driving a facsimile scanner or the like indicated generally by reference character 11. This scanner may be of any desired type and may be used at a transmitting or receiving station. It is shown for purposes of illustration as being employed at a receiving station. The scanner 11 comprises a copy holding drum 14 and a scanning head 16 propelled axially along the drum by a lead screw 17. It will be understood that the scanning head 16 may include a recording lamp or an electrolytic recording member. For slow speed scanning any suitable change speed device may, if desired, be used to connect the drive shaft 19 of the motor with the drive shaft 21 of the scanner. For example, a friction drive wheel with or without speed reduction may be employed. A gear and pinion combination 23 drives the lead screw 17 at the proper relative speed so that closely spaced helical scanning lines are obtained as the scanning head 16 moves axially of the drum 14.

Connected to the shaft 19 of the induction motor, is a tone wheel 26 which is provided with teeth so that as the tone wheel revolves, the teeth pass through the magnetic field of a magnet 28, thereby producing an alternating voltage in a coil 29 surrounding a portion of the magnetic circuit of the magnet. It will be understood that the tone wheel 26 may be geared to the motor shaft or mechanically connected in any suitable manner to a moving part of the scanner 11.

An induction motor 33 is coupled to or otherwise operatively associated with the motor shaft 19 and serves as a magnetic brake to retard the driving motor 10. The action of the induction motor 33 with variations in phase of the synchronizing tone and the tone generated by the tone wheel 26 will be fully discussed hereinafter in connection with Figs. 2 to 9 of the drawings.

Fig. 10 of the drawings shows an alternative arrangement in which an electromagnetically operated friction brake is employed. It will be understood that an eddy current type of brake may also be used.

It will be appreciated that the passage of the teeth on the tone wheel 26 through the magnetic field in the neighborhood of the magnet 28 will produce an alternating voltage e3 (Fig. 2) in the coil 29. An 1800 cycle tone has been assumed purely for illustrative purposes.

The incoming synchronizing tone or signal appearing across the terminals 33 and 34 is also assumed to be 1800 cycles for illustrative purposes. This incoming tone (voltage e1 on Fig. 2) usually is separated from a received facsimile signal in any one of a number of well known ways. With the reference frequency e1 equal to the generated frequency, it will be apparent that if the scanning apparatus shown remains in synchronism with the scanner originating the synchronizing signal, there will be a constant phase relationship between the two waves. The relationship may be an in phase condition, or with the voltage e3 leading or lagging the voltage e1 by a constant angle.

Figure 7:
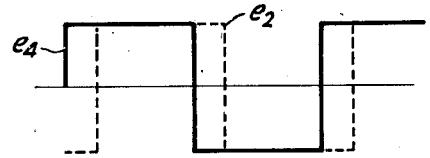
Figure 4:
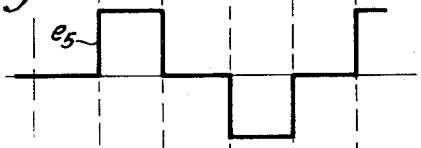
Figure 8:
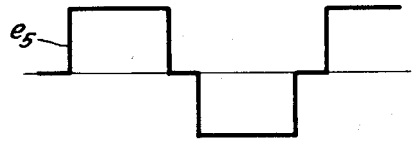

The variation in the time relationship between the derived square waves e2 and 34 shown in Figs. 3 and 7 will be discussed in detail hereinafter.

Combining of square waves is disclosed but not claimed per se in a copending application of Henry E. Hallborg et al., Serial No. 491,538, filed June 19, 1943.

Figure 3:
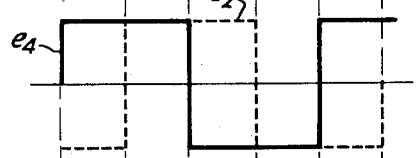

The synchronizing signal e1 which is shown as being approximately sinusoidal, is passed through a tube 44 which operates as a limiter-amplifier in a manner well known in the art to change the sine wave of voltage into a series of square waves e2 (Fig. 3). The voltage output of the coil 29, which is also substantially sinusoidal and equal in nominal frequency to the frequency of the voltage e1, is applied to a tube 47 which also operates as a limiter-amplifier, the output of which is a series of square wave impulses e4 (Fig. 3). e4 in this case is shown as lagging e2.

The square wave output from the tube 44 appears across a resistor 50, while the square wave output which is derived from the generator coil 29 appears across the resistor 51. In normal operation, the frequency of these waves is equal, but the phase relationship between them may vary momentarily. The resulting beat frequency voltage e5 which is proportional to the instantaneous speed of the motor 10 appears across a resistor 52.

The voltage e5 is amplified, if desirable or necessary, in an amplifier tube 65 of any suitable type, the output of which is impressed on a full wave rectifier 66 by way of a transformer 67. A unidirectional pulsating voltage is provided in the output circuit of the rectifier 66, across a resistor 68, the equivalent average value of which varies in amplitude with the phase relationship between the two voltages e1 and e3.

The unidirectional pulsating voltage appearing across the resistor 68 is amplified by a tube 69 and a power amplifier tube 71. The amplified current output of the tube 71 is applied by conductors 74 to the primary of the brake motor 33. The amplified voltage wave in the output of the tube 71 will be a D. C. voltage varying in average potential to the phase shift. This is an ideal condition for synchronism control, and can be used in voltage control of arrangements of the kind disclosed and claimed in Patent No. 2,325,028, granted to this applicant on July 27, 1943, or to control a brake load as shown here.

Figure 5:
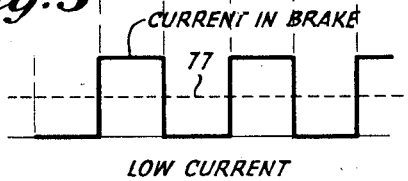

Referring to Figs. 2 to 5 of the drawings, a momentary condition is illustrated where the rotor of the motor 10 assumes a retarded angular position thereby requiring a relatively low average brake load current. The voltage e3 lags the voltage e1. The phase relationship of the voltages e2 and e4 when added or beat together produces the curve e5 of Fig. 4. The current output curve of the tube 71 appears as shown in Fig. 5 of the drawings. The dotted line 77 on Fig. 5 indicates the average brake load current. The brake load is merely the equivalent of an induction motor with D. C. applied to the windings and all induced currents in the rotor are loss currents and increase the load. This variable load is controlled in value to hold the motor in synchronism with the incoming tone, the load varying in effect fast enough to give a cycle by cycle synchronism rather than an average speed control.

Any type driving motor may be used, induction or other, in which a varying load will vary the speed over the range of control desired.

Figs. 6 to 9 indicate the operation of the device when the rotor of the motor 10 assumes a less retarded angular position than under conditions assumed in Figs. 2 to 5 and therefore, a higher brake load current is to be supplied to the motor 33. The dotted line 78 of Fig. 9 of the drawings indicates that the average value of the brake load current is higher in this case. The curves of Figs. 2 to 9 are illustrative only and are not intended to represent accurate values to scale or actual wave forms.

Fig. 10 discloses an arrangement of apparatus somewhat similar to that of Fig. 1 in which the brake motor 33 is replaced by an electromagnetically operated friction brake 79. Similar reference characters will be used for like parts in these two figures. The rotary armature 82 of magnetic material of the brake 79 is secured for rotation upon the shaft 19 of the motor 10 by a key 80. The key permits limited axial movement and a compression spring 85 presses the armature 82 to the left as viewed on Fig. 10. The stationary field member 83 of the brake 79 is shown as being supported by the shaft 19 which rotates in a bearing aperture 84, but the member 83 is restrained from rotation by any suitable means (not shown). The leads 86 of the brake operating coil 88 replace the conductors 74 of Fig. 1 of the drawings and are to be connected to the amplifier tube 71 of Fig. 1 of the drawings. In this manner the friction brake 79 serves the same purpose as the induction motor 33. Varying energization of the coil 88 draws the rotating armature 82 with varying force against the stationary field structure 83.

The brake 79 of Fig. 10 may be employed as an eddy current brake by forming the wheel or disc 82 of conducting material and securing it on the shaft 19 so that it is spaced from the magnet 83. Eddy currents induced in the disc will then provide the drag.

It will be understood that in place of the conventional brake shown in Fig. 10, which resembles somewhat an electromagnetic clutch, a solenoid operated shoe brake may be employed to contact with the face or periphery of a brake disc or wheel similar to the disc 82. A spring may be employed to press the shoe against the brake wheel with the solenoid operating to decrease the shoe pressure. With this modified arrangement, the polarity of the amplifiers is such that the brake current is increased in proportion to phase displacement. That is, when conditions are as shown in Figs. 2 to 5, the average solenoid current will be high. This may also be accomplished by having the voltage $e3$ lead the voltage $e1$.

Figure 9:
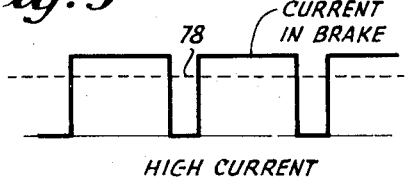

It will be noticed that while average values of brake current are shown as dotted lines 77 in Fig. 5 and 78 in Fig. 9, these averages are not obtained electrically in the preferred form of the invention by the use of storage capacitors at any point in the amplifying system, but the actual square wave of on-off current is applied directly to the brake windings. These equivalent averages are shown for explanation only. In practice the brake itself averages these on-off periods to produce a mechanical load of the correct value to hold synchronism, but without in itself ever being at this average current or load. With the exception of the current build-up or decay time in the brake coil itself, the brake is always either full on or off. The build-up time is made small with respect to the time of one cycle by having a low brake inductance and high current capacity in the output stage 71. This condition improves or completely eliminates the tendency to hunt found in most synchronous motor systems. The reasons for this improvement are given below.

In the usual synchronous motor system the restoring force is made equal to the phase displacement, or nearly so, and with a system having zero rotational inertia very nearly perfect synchronism will be obtained without hunting. With the addition of inertia to the system a tuning effect will be obtained in which the inertia acts as an inductance or lagging component while the restoring force of the motor will be advanced with respect to the correct phase position and act as a capacity or leading component. This can lead to violent hunting so that the system obtains average synchronism only, and continually oscillates about this true angular position as a tortional pendulum.

As it is impossible to build a system with zero inertia, the inertia effect must be eliminated by other means to prevent mechanical hunting. In this invention a complete electrical "hunting" is introduced into the restoring force by the on-off action of the brake, and this hunting is made so high in frequency that the mechanical system with its rotational inertia can follow only the average value of the electrical on-off system. Thus the electrical restoring force is not supplied at the natural mechanical period of oscillation, as in the usual synchronous system, and the mechanical system is not excited into oscillation or hunting at its natural period.

As an illustration, if a pendulum is pulsed at somewhere near its natural period complete oscillation will be built up, but if pulsed at a very much higher rate, it can be pushed to any position in its arc of swing and held in that exact position by these pulses without any tendency to oscillate. With the output tube 71 so proportioned to the brake inductance that current build-up or decay in the brake uses only a small portion of the time of each synchronizing cycle, this ideal condition is almost completely realized and synchronism without hunting is obtained.

Having now described the invention, what is claimed and desired to be secured by Letters Patent is the following:

1. In a facsimile system, a scanner, power drive means for operating said scanner, means for deriving a signal representing the speed of scanning, means for deriving a signal representing the desired scanning speed, means for producing substantially square waves from both said signals, means for combining said square waves to produce pulses having a value thereof proportional to the phase difference between said signals, means for producing a unidirectional current having a value proportional to the amplitude of said pulses, and an electro-magnetically operated brake exerting a retarding force on said scanner, said retarding force in any instant being proportional to the value of said pulses.

2. In a facsimile system, a scanner, power drive means for operating said scanner, means for deriving a signal representing the speed of scanning, means for deriving a signal representing the desired scanning speed, means for producing substantially square waves from both said signals, means for combining said square waves to produce pulses having a value proportional to the difference in phase between said signals, means for producing unidirectional current having a value determined by the amplitude of said pulses, and an electromagnetically operated alternating current motor operatively connected to said power drive means whereby said motor exerts a retarding effect upon said scanner, and means for supplying said unidirectional current to the operating winding of said motor.

3. In a facsimile system, a scanner, power drive means for operating said scanner, means for deriving a signal representing the speed of scanning, means for deriving a signal representing the desired scanning speed, means for producing substantially square waves from both said signals, means for combining said square waves to produce pulses having a value proportional to the difference in phase between said signals, means for producing a unidirectional current having a value determined by the value of said pulses, a single phase induction motor operatively connected to said power drive means whereby said motor exerts a retarding effect upon said scanner, and, means for supplying said unidirectional current to the primary winding of said motor.

4. The method of synchronizing the operation of a plurality of prime movers which comprises the steps of developing a square wave signal representative of a phase of the cycle of operation of each of said prime movers, comparing the developed signals, developing a square topped pulse representative of the comparison of said signals, and utilizing the pulse signals representative of the comparison of said square waves to control the instantaneous angular position of a moving part of at least one of said prime movers.

5. In facsimile apparatus wherein image signals representative of the optical values of a transmitted image are received as recurring trains of signals, and wherein synchronizing signals interspersed between said recurring trains of signals are received, means for locally generating square wave signals indicative of the speed and phase of the driving motor of said facsimile apparatus, means for developing a series of square wave pulses representative of the instantaneous value and phase relationship of the combined synchronizing and locally generated signals, and means for utilizing said developed square wave pulses to control the instantaneous angular position of the driving motor of said facsimile apparatus.

6. In an apparatus for synchronizing the movement of a prime mover with that of another prime mover, and wherein a signal is provided indicative of the phase and speed of one of said prime movers, means for generating an electrical signal representative of the phase of the prime mover to be synchronized, means for combining the locally generated signal and the provided signal, an electromagnetically operated brake, means for providing brake current proportional to the instantaneous combined values of the provided wave and the locally generated wave, said electromagnetically operated brake being operative to change the instantaneous angular position with respect to the instantaneous synchronous angular position of the prime mover to be synchronized.

MAURICE ARTZT.